(12) United States Patent
Tsuchiya et al.

(10) Patent No.: US 11,544,600 B2
(45) Date of Patent: Jan. 3, 2023

(54) PREDICTION RATIONALE ANALYSIS APPARATUS AND PREDICTION RATIONALE ANALYSIS METHOD

(71) Applicant: Hitachi, Ltd., Tokyo (JP)

(72) Inventors: Ryosuke Tsuchiya, Tokyo (JP); Shuhei Nojiri, Tokyo (JP); Ryota Mibe, Tokyo (JP); Tarou Sakisaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 295 days.

(21) Appl. No.: 17/015,283

(22) Filed: Sep. 9, 2020

(65) Prior Publication Data

US 2021/0279608 A1     Sep. 9, 2021

(30) Foreign Application Priority Data

Mar. 4, 2020   (JP) .............................. JP2020-036725

(51) Int. Cl.
*G06F 15/16*      (2006.01)
*G06N 5/04*       (2006.01)
*G06N 20/00*      (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
USPC ........................................................ 709/200
See application file for complete search history.

(56) References Cited

U.S. PATENT DOCUMENTS

| | | | |
|---|---|---|---|
| 10,558,888 B2* | 2/2020 | Fujimaki ................. | G06F 17/18 |
| 10,678,233 B2* | 6/2020 | Cella ..................... | H04L 47/122 |
| 10,833,508 B2* | 11/2020 | Wang ..................... | G06F 1/3209 |
| 11,036,215 B2* | 6/2021 | Cella ................... | G05B 19/4183 |
| 11,209,813 B2* | 12/2021 | Cella ..................... | G06V 10/776 |

(Continued)

FOREIGN PATENT DOCUMENTS

JP      2019-082883 A     5/2019

OTHER PUBLICATIONS

M. T. Ribeiro, et al., "'Why Should I Trust You?': Explaining the Predictions of Any Classifier", Proceedings of the 22nd ACM SIGKDD International Conference on Knowledge Discovery and Data Mining, pp. 1135-1144, (2016).

(Continued)

*Primary Examiner* — Moustafa M Meky
(74) *Attorney, Agent, or Firm* — Baker Botts L.L.P.

(57) ABSTRACT

A prediction rationale analysis apparatus includes a prediction model that stores prediction models designed or trained to solve common problems, a prediction execution part that makes a prediction on the prediction target based on each prediction model to derive a model prediction result, a prediction rationale analyzer that identifies a set of prediction models based on which the model prediction result identical or approximate to the external prediction result is derived from the prediction target, and infers, as a prediction rationale for the external prediction result, a property common to the prediction models belonging to the set, and a prediction rationale difference analyzer that compares a property of any prediction model with the prediction rationale for the external prediction result to derive a prediction rationale difference indicating a difference in prediction rationale between the prediction model and the external prediction, and outputs information based on the prediction rationale difference.

11 Claims, 10 Drawing Sheets

(56) References Cited

U.S. PATENT DOCUMENTS

| | | | | |
|---|---|---|---|---|
| 11,232,473 | B2* | 1/2022 | Kitts | G06Q 30/0251 |
| 11,392,116 | B2* | 7/2022 | Cella | H04B 17/26 |
| 11,397,428 | B2* | 7/2022 | Cella | G06N 3/084 |
| 11,409,266 | B2* | 8/2022 | Cella | G06N 7/005 |
| 2018/0284755 | A1* | 10/2018 | Cella | G06Q 30/0278 |
| 2019/0324432 | A1* | 10/2019 | Cella | H04L 43/045 |
| 2019/0324443 | A1* | 10/2019 | Cella | H04B 17/318 |
| 2019/0324444 | A1* | 10/2019 | Cella | G06N 3/088 |
| 2020/0257925 | A1 | 8/2020 | Kuwajima et al. | |

OTHER PUBLICATIONS

P. W. Koh, et al., "Understanding black-box predictions via influence functions", Proceedings of the 34th International Conference on Machine Learning—vol. 70, pp. 1885-1894, (2017).

* cited by examiner

PREDICTION RATIONALE ANALYSIS APPARATUS AND PREDICTION RATIONALE ANALYSIS METHOD

BACKGROUND OF THE INVENTION

1. Field of the Invention

The present invention relates to a prediction rationale analysis apparatus and a prediction rationale analysis method and is suitably applied to a prediction rationale analysis apparatus and prediction rationale analysis method for analyzing a prediction rationale for a prediction activity.

2. Description of the Related Art

As disclosed in JP 2019-082883 A, Marco Tulio Ribeiro et al., (2016) "'Why Should I Trust You?': Explaining the Predictions of Any Classifier", Proceedings of the 22nd ACM SIGKDD International Conference on Knowledge Discovery and Data Mining, Pages 1135-1144, and Pang Wei Koh et al., (2017) "Understanding black-box predictions via influence functions", Proceedings of the 34th International Conference on Machine Learning—Volume 70, Pages 1885-1894, techniques for analyzing a prediction rationale of a prediction model based on machine learning are known.

JP 2019-082883 A describes "an inference device (1) for inferring to which prescribed class input information belongs by means of inference using an inference model generated with machine learning, said inference device (1) comprising: an input part (10) for receiving an input of information; a frequently appearing feature value database (16) storing, as a frequently appearing feature value for each class, a feature value frequently appearing in an inference process using the inference model; an inference part (11) for inferring to which class the input information belongs, using the inference model; a representative feature value extraction part (13) for extracting feature values appearing in the inference process in the inference part (11) and extracting a representative feature value which satisfies a prescribed condition from among the feature values; a rationale feature value computation part (14) for retrieving a frequently appearing feature value associated with the inferred class from the frequently appearing feature value database (16) and extracting one or a plurality of rationale feature values based on the frequently appearing feature value and the representative feature value; and an output part (12) for outputting the inferred class and the rationale feature value".

Further, under a technique called Local Interpretable Model-agnostic Explanations (LIME) disclosed in Marco Tulio Ribeiro et al., (2016) "'Why Should I Trust You?': Explaining the Predictions of Any Classifier", Proceedings of the 22nd ACM SIGKDD International Conference on Knowledge Discovery and Data Mining, Pages 1135-1144, a feature value that greatly contributes to a prediction result is extracted from among feature values in input data for each prediction. Under this technique, prediction models that locally approximate to each other are created based on a plurality of pieces of perturbation data close to the input data, and a local prediction rationale for each piece of the input data, rather than a global prediction rationale is extracted.

Further, a function called "Influence Function" disclosed in Pang Wei Koh et al., (2017) "Understanding black-box predictions via influence functions", Proceedings of the 34th International Conference on Machine Learning—Volume 70, Pages 1885-18944 computes the degree of influence of each piece of training data on a prediction result of input data for each prediction. The function computes, as the degree of influence, a change in prediction result caused by the presence or absence of or perturbation in each piece of training data.

SUMMARY OF THE INVENTION

According to the techniques for analyzing a prediction rationale disclosed in JP 2019-082883 A, Marco Tulio Ribeiro et al., (2016) "'Why Should I Trust You?': Explaining the Predictions of Any Classifier", Proceedings of the 22nd ACM SIGKDD International Conference on Knowledge Discovery and Data Mining, Pages 1135-1144, and Pang Wei Koh et al., (2017) "Understanding black-box predictions via influence functions", Proceedings of the 34th International Conference on Machine Learning—Volume 70, Pages 1885-18944, it is possible to extract a prediction rationale for a prediction model in a form interpretable to humans. However, no description has been given of analysis of a difference in prediction rationale between a plurality of prediction models or between a prediction model and a human. In particular, when prediction results differ between a human and a prediction model, in order to determine the cause of the difference between the prediction results or to determine the superiority or inferiority between the prediction results, it is considered important to analyze a difference in prediction rationale between the prediction results.

The present invention has been made in view of the above-described circumstances, and provides a prediction rationale analysis apparatus and prediction rationale analysis method capable of analyzing a difference in prediction rationale between at least two prediction means (a predictor and a prediction model) that have carried out a prediction activity on the same input data.

In order to solve such a problem, an aspect of the present invention provides a prediction rationale analysis apparatus that analyzes a prediction rationale for a prediction activity, the prediction rationale analysis apparatus including a prediction model storage that stores a plurality of prediction models designed or trained to solve a common problem, a prediction execution part that makes, upon receipt of information on a prediction target, a prediction on the prediction target based on each of the plurality of prediction models to derive a model prediction result indicating a result of the prediction, a prediction rationale analyzer that identifies, upon receipt of an external prediction result indicating a result of an external prediction made on the prediction target by an external means, a set of the prediction models based on which the model prediction result is derived from the prediction made on the prediction target by the prediction execution part, the model prediction result being identical or approximate to the external prediction result, and infers, as a prediction rationale for the external prediction result, a property common to the prediction models belonging to the set of prediction models, and a prediction rationale difference analyzer that compares a property of any one of the plurality of prediction models stored in the prediction model storage with the prediction rationale for the external prediction result inferred by the prediction rationale analyzer to derive a prediction rationale difference indicating a difference in prediction rationale between the prediction model and the external prediction, and outputs information based on the prediction rationale difference.

Further, in order to solve such a problem, an aspect of the present invention provides a prediction rationale analysis apparatus that analyzes a prediction rationale for a prediction activity, the prediction rationale analysis apparatus including a prediction model storage that stores a plurality of prediction models that are designed or trained to solve a common problem and based on which a prediction result of and a prediction rationale for a prediction made on a prediction target are derived, a prediction execution part that makes, upon receipt of information on the prediction target, the prediction on the prediction target based on each of the plurality of prediction models to derive a model prediction result indicating a result of the prediction and a model prediction rationale indicating a rationale for the prediction, a prediction rationale analyzer that identifies, upon receipt of an external prediction result indicating a result of an external prediction made on the prediction target by an external means, a set of the prediction models based on which the model prediction result is derived from the prediction made on the prediction target by the prediction execution part, the model prediction result being identical or approximate to the external prediction result, and infers, as a prediction rationale for the external prediction result, the model prediction rationale common to the prediction models belonging to the set of prediction models, and a prediction rationale difference analyzer that compares the model prediction rationale for a prediction based on any one of the plurality of prediction models stored in the prediction model storage with the prediction rationale for the external prediction result inferred by the prediction rationale analyzer to derive a prediction rationale difference indicating a difference in prediction rationale between the prediction model and the external prediction, and outputs information based on the prediction rationale difference.

Further, in order to solve such a problem, an aspect of the present invention provides a prediction rationale analysis method for causing a prediction rationale analysis apparatus to analyze a prediction rationale for a prediction activity, the prediction rationale analysis apparatus including a prediction model storage that stores a plurality of prediction models designed or trained to solve a common problem, the prediction rationale analysis method including a prediction execution step of making, upon receipt of information on a prediction target, a prediction on the prediction target based on each of the plurality of prediction models stored in the prediction model storage to derive a model prediction result indicating a result of the prediction, a prediction rationale analysis step of identifying, upon receipt of an external prediction result indicating a result of an external prediction made on the prediction target by an external means, a set of the prediction models based on which the model prediction result is derived from the prediction made on the prediction target in the prediction execution step, the model prediction result being identical or approximate to the external prediction result, and inferring, as a prediction rationale for the external prediction result, a property common to the prediction models belonging to the set of prediction models, and a prediction rationale difference analysis step of comparing a property of any one of the plurality of prediction models stored in the prediction model storage with the prediction rationale for the external prediction result inferred in the prediction rationale analysis step to derive a prediction rationale difference indicating a difference in prediction rationale between the prediction model and the external prediction, and outputting information based on the prediction rationale difference.

According to the present invention, it is possible to analyze a difference in prediction rationale between at least two prediction means that have carried out a prediction activity on the same input data.

DESCRIPTION OF THE PREFERRED EMBODIMENTS

Hereinafter, embodiments of the present invention will be described in detail with reference to the drawings.

(1) First Embodiment

A prediction rationale analysis apparatus 100 according to the first embodiment of the present invention will be described.

(1-1) Structure of Prediction Rationale Analysis Apparatus 100

Figure 1:
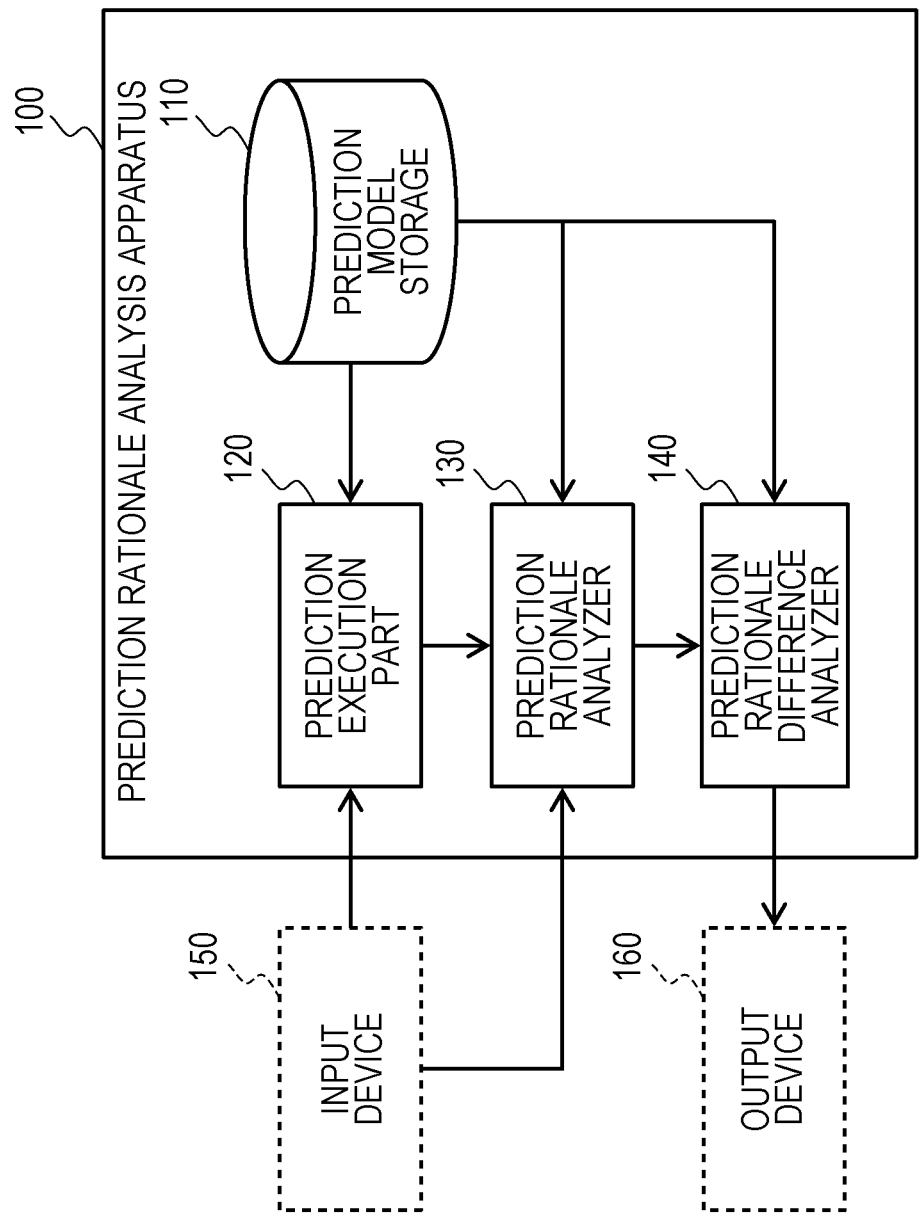
FIG. 1 is a block diagram showing an example of a structure of a prediction rationale analysis apparatus according to a first embodiment.

FIG. 1 is a block diagram showing an example of a structure of the prediction rationale analysis apparatus 100 according to the first embodiment. The prediction rationale analysis apparatus 100 is a computer including, for example, a processor, a storage device, various interfaces, and the like, and includes, as functional components, a prediction model storage 110, a prediction execution part 120, a prediction rationale analyzer 130, and a prediction rationale difference analyzer 140. Note that FIG. 1 shows, as an example, a structure where the prediction rationale analysis apparatus 100 is connected to an input device 150 and an output device 160 provided outside the prediction rationale analysis apparatus 100, but the prediction rationale analysis apparatus 100 may include the input device 150 or the output device 160.

The prediction model storage 110 stores at least two prediction models 200 designed or trained to solve a problem related to a common prediction activity. Herein, the problem related to the prediction activity refers to a classification problem of predicting to which class input data belongs, a regression problem of predicting a target continuous value based on the input data, and the like. Although the details will be described later with reference to FIG. 2, the prediction model 200 includes, for example, a model ID 210, a model property 220, and a prediction execution entity 230. The prediction model storage 110 is a storage device including a volatile storage device such as a random access memory (RAM), or a non-volatile storage device such as a read only memory (ROM), a hard disk drive (HDD), or a solid state drive (SSD).

The prediction execution part 120 has a function of making a prediction using test data input from the outside based on all the prediction models 200 stored in the prediction rationale analysis apparatus 100. More specifically, the prediction execution part 120 receives, as input, test data 310 to be used in prediction out of input information 300 (see FIG. 3) input from the input device 150 to the prediction rationale analysis apparatus 100, and makes a prediction using the test data 310 based on all the prediction model 200 stored in the prediction model storage 110 to derive model prediction result information 410 (see FIG. 4) including a model prediction result 411 for each of the prediction models 200. The prediction execution part 120 includes a storage device that stores an algorithm of the above-described function and a processor such as a central processing unit (CPU) that controls the function.

The prediction rationale analyzer 130 has a function of inferring a prediction rationale for a result of a prediction made using the test data 310 by an external means (external prediction result) from the respective results of predictions made using the same test data 310 by the prediction execution part 120 based on all the prediction models 200 (model prediction result information). More specifically, the prediction rationale analyzer 130 receives, as input, an external prediction result 320 that is a result of a prediction made using the test data 310 by any means provided outside the prediction rationale analysis apparatus 100, the external prediction result 320 being a part of the input information 300 input from the input device 150 to the prediction rationale analysis apparatus 100, identifies an external prediction approximate model set 510 indicating a set of prediction models 200 based on which the model prediction results 411 identical or approximate to the external prediction result 320 are derived, identifies an approximate model set common property 520 that is a model property 220 common to the prediction models 200 included in the external prediction approximate model set 510, and infers the approximate model set common property 520 as a prediction rationale for the external prediction result 320. The prediction rationale analyzer 130 includes a storage device that stores an algorithm of the above-described function and a processor such as a CPU that controls the function.

The prediction rationale difference analyzer 140 has a function of analyzing, based on the prediction rationale for the external prediction result 320 inferred by the prediction rationale analyzer 130 and the model property 220 of any one of the prediction models 200, a difference in prediction rationale (prediction rationale difference) between the external prediction and the prediction model. More specifically, the prediction rationale difference analyzer 140 compares the model property 220 of any one of the prediction models 200 stored in the prediction model storage 110 with the approximate model set common property 520 identified by the prediction rationale analyzer 130 to derive a prediction rationale difference 610 between the prediction model 200 and the external prediction, and causes the output device 160 to output information 700 based on the derived result. The prediction rationale difference analyzer 140 includes a storage device that stores an algorithm of the above-described function and a processor such as a CPU that controls the function.

Note that the storage devices that belong to the prediction execution part 120, the prediction rationale analyzer 130, and the prediction rationale difference analyzer 140 may be the same as or separate from the storage device that serves as the prediction model storage 110.

The input device 150 is an input device such as a keyboard or a mouse, and the input information 300 is input to the prediction rationale analysis apparatus 100 through the input device 150. Although the details will be described later with reference to FIG. 3, the input information 300 includes, for example, the test data 310 and the external prediction result 320. The input device 150 further allows training data for use in training based on machine learning of the prediction model 200 to be input to the prediction rationale analysis apparatus 100.

The output device 160 is an output device such as a display or a printer, and the output information 700 based on a calculation result from the prediction rationale analysis apparatus 100 is output in the form of a screen display or printed document through the output device 160. Although the details will be described later with reference to FIG. 7, the output information 700 includes, for example, the prediction rationale difference 610 and a prediction rationale difference handling guideline 710.

(1-2) Prediction Model 200

Figure 2:
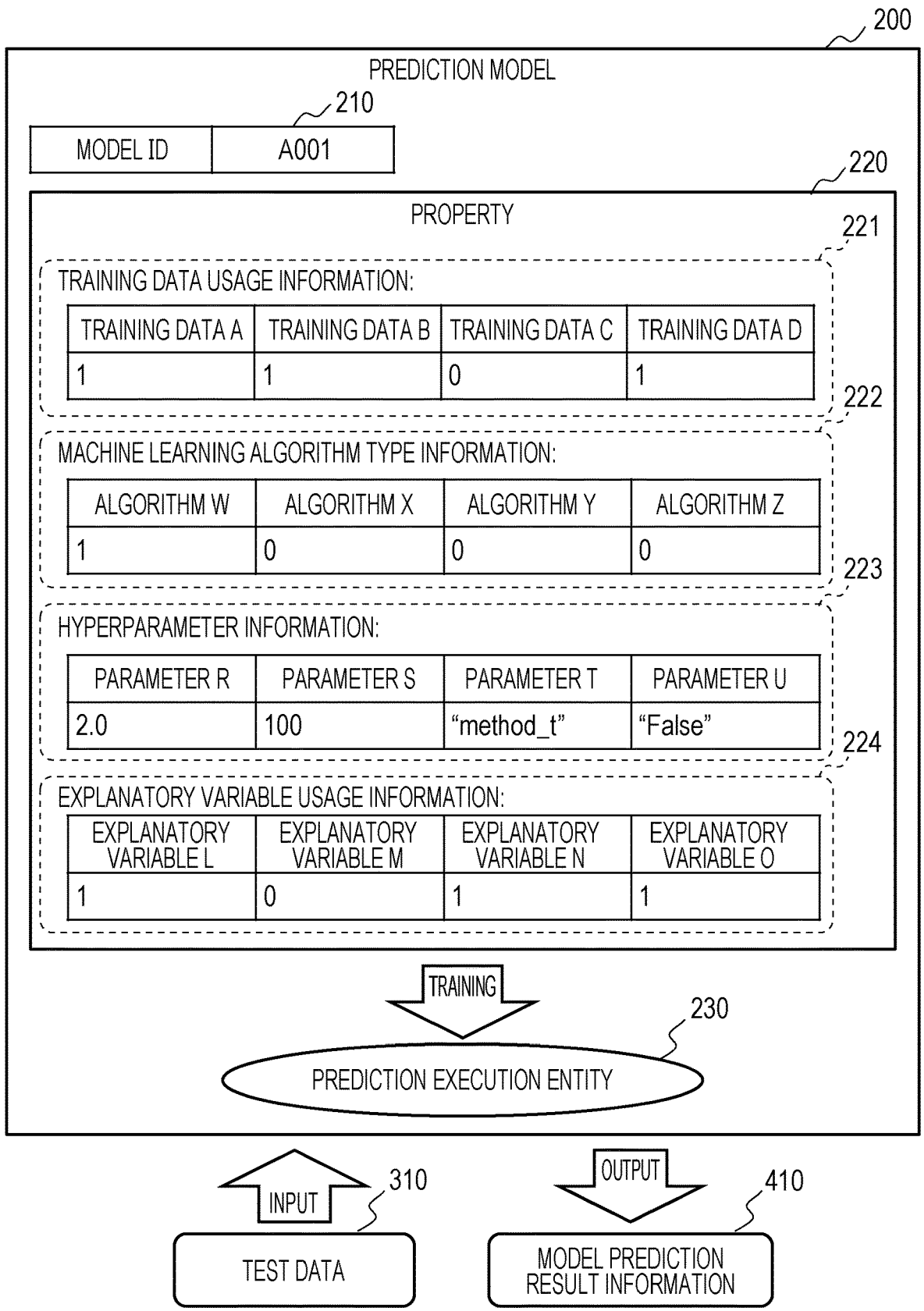
FIG. 2 is a diagram showing an example of a prediction model.

FIG. 2 is a diagram showing an example of the prediction model 200. The prediction model 200 shown in FIG. 2 includes the model ID 210 indicating a model identifier, the model property 220 indicating a model feature or property, and the prediction execution entity 230 designed and trained based on the model property 220 to make a prediction using the input test data 310 and output the model prediction result information 410.

The model ID 210 is represented by a character string such as "A001" shown in FIG. 2. However, the notation of the model ID 210 according to the present embodiment is not limited to such a character string, and any notation may be employed.

The model property 220 is represented by a set of elements (pieces of information) each indicating a model feature or property. FIG. 2 shows, as specific examples of the elements included in the model property 220, training data usage information 221, machine learning algorithm type information 222, hyperparameter information 223, and explanatory variable usage information 224.

The training data usage information 221 is information indicating training data for use in machine learning. Specifically, for example, the training data usage information 221 can be represented in such a manner where "1" is set for training data that has been used in training of the prediction execution entity 230 based on machine learning, and "0" is set for training data that has not been used. The prediction model 200 shown in FIG. 2 indicates that training data A, training data B, and training data D have been used, but training data C has not been used. Further, the training data usage information 221 may indicate not only used or unused information, but also other information such as whether specific pre-processing has been executed on each training data.

The machine learning algorithm type information 222 is information indicating the type of algorithm that has been applied to training of the prediction execution entity 230 based on machine learning. Specifically, for example, the machine learning algorithm type information 222 can be represented in such a manner where "1" is set for an algorithm that has been applied to training of the prediction execution entity 230 based on machine learning, and "0" is set for an algorithm that has not been applied. The prediction model 200 shown in FIG. 2 indicates that an algorithm W has been applied. Specific examples of machine learning algorithm types to be shown as the machine learning algorithm type information 222 include, for example, support vector machine, Bayes, decision tree, random forest, and neural network as typical algorithm types.

The hyperparameter information 223 is information indicating a parameter (hyperparameter) that needs to be preset for machine learning (before training). Specifically, for example, the hyperparameter information 223 can be represented by a combination of a parameter item and parameter value. The hyperparameter varies in a manner that depends on an applied machine learning algorithm, and, for example, "tree depth" is known as a typical parameter item.

The explanatory variable usage information 224 is information indicating an explanatory variable for use in machine learning. Specifically, for example, the explanatory variable usage information 224 can be represented in such a manner where "1" is set for an explanatory variable that has been used in training of the prediction execution entity 230 based on machine learning, and "0" is set for an explanatory variable that has not been used. The prediction model 200 shown in FIG. 2 indicates that explanatory variables L, N, and O have been used, but an explanatory variable M has not been used. Further, the explanatory variable usage information 224 may indicate not only used or unused information, but also information on a weight given to each explanatory variable, the weight being determined as a result of the training of the prediction execution entity 230.

Note that as the explanatory variable, information extracted, by any predetermined means, from training data or test data to be input may be used. When such input data is text information, the appearance frequency of each word can be extracted as the explanatory variable. Further, the explanatory variable usage information 224 may include a feature value mechanically obtained by an auto encoder that is a type of neural network.

The prediction execution entity 230 is an algorithm designed and trained based on preconditions included in the model property 220, and having a function of making a prediction upon input of the test data 310 and outputting the model prediction result information 410 including a result of the prediction (model prediction result 411). Specifically, for example, a program obtained by designing and training a model provided by scikit-learn, which is a machine learning library for the Python programming language, based on the preconditions included in the model property 220 can be regarded as the prediction execution entity 230.

(1-3) Input Information 300

Figure 3:
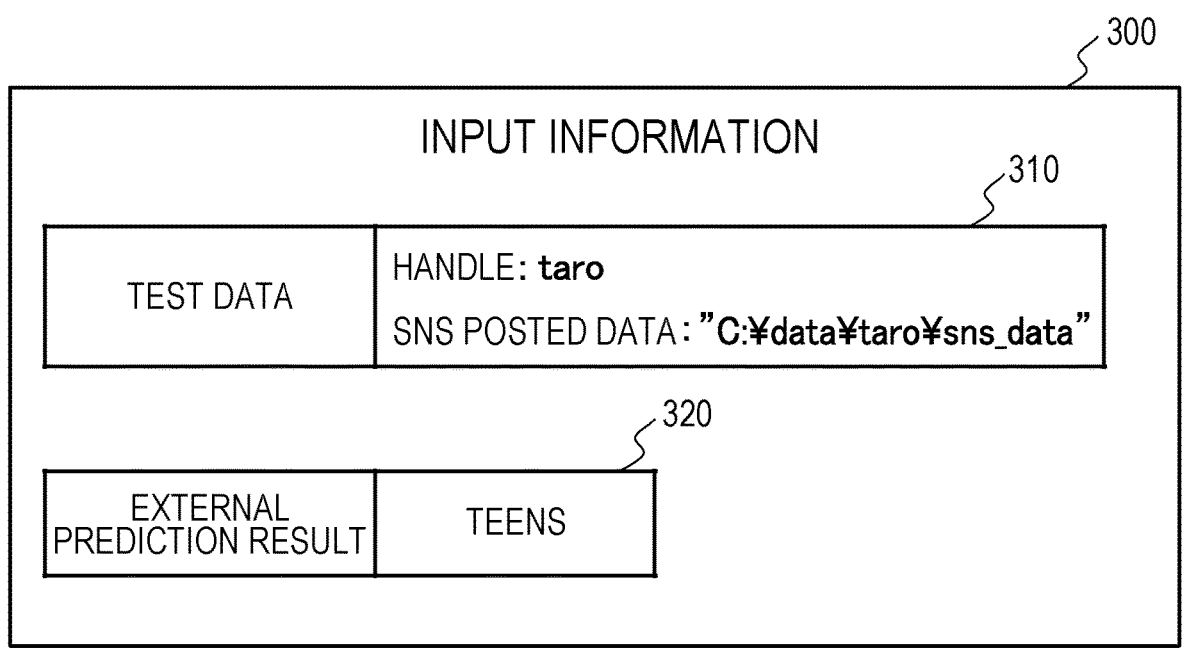
FIG. 3 is a diagram showing an example of input information.

FIG. 3 is a diagram showing an example of the input information 300. The input information 300 shown in FIG. 3 includes the test data 310 to be used in prediction, and the external prediction result 320 that is a result of a prediction made using the test data 310 based on any means provided outside the prediction rationale analysis apparatus 100. For example, a result of a prediction made by a human or a result of a prediction made based on a prediction model 200 not stored in the prediction model storage 110 may be the external prediction result 320.

The test data 310 includes an element such as text data or media data such as an image and video. In FIG. 3, as an example, it is assumed that a prediction activity is made for predicting an age group to which a poster belongs from data posted on a social networking service (SNS), and a poster's handle and past data posted on the SNS are used as the test data 310 for use in prediction. The test data 310 shown in FIG. 3 indicates that the poster's handle of "taro" and the past data posted on the SNS by the poster represented as "C:\data\taro\sns_data" that is intended to represent a data storage path on a storage of the prediction rationale analysis apparatus 100 or a storage of an external personal computer are input.

Note that, the prediction execution entity 230 (see FIG. 2) of the prediction model 200 extracts, upon receipt of the test data 310 as input, information serving as an explanatory variable based on the same method as applied to the training data at the time of training. For example, the handle may be extracted, as it is, as a categorical explanatory variable, or alternatively, the handle may be regarded as text information, and the appearance frequency of a word or character contained in the handle may be extracted as an explanatory variable.

The external prediction result 320 serves as, for example, a categorical value when the prediction activity is made for a classification problem and a continuous value when the prediction activity is made for a regression problem. The external prediction result 320 shown in FIG. 3 indicates that the prediction activity is made for predicting the age group to which the poster belongs from the data posted on the SNS, and a result of the prediction of the age group to which the SNS poster belongs as "teens" is input.

(1-4) Prediction Execution Processing

Figure 4:
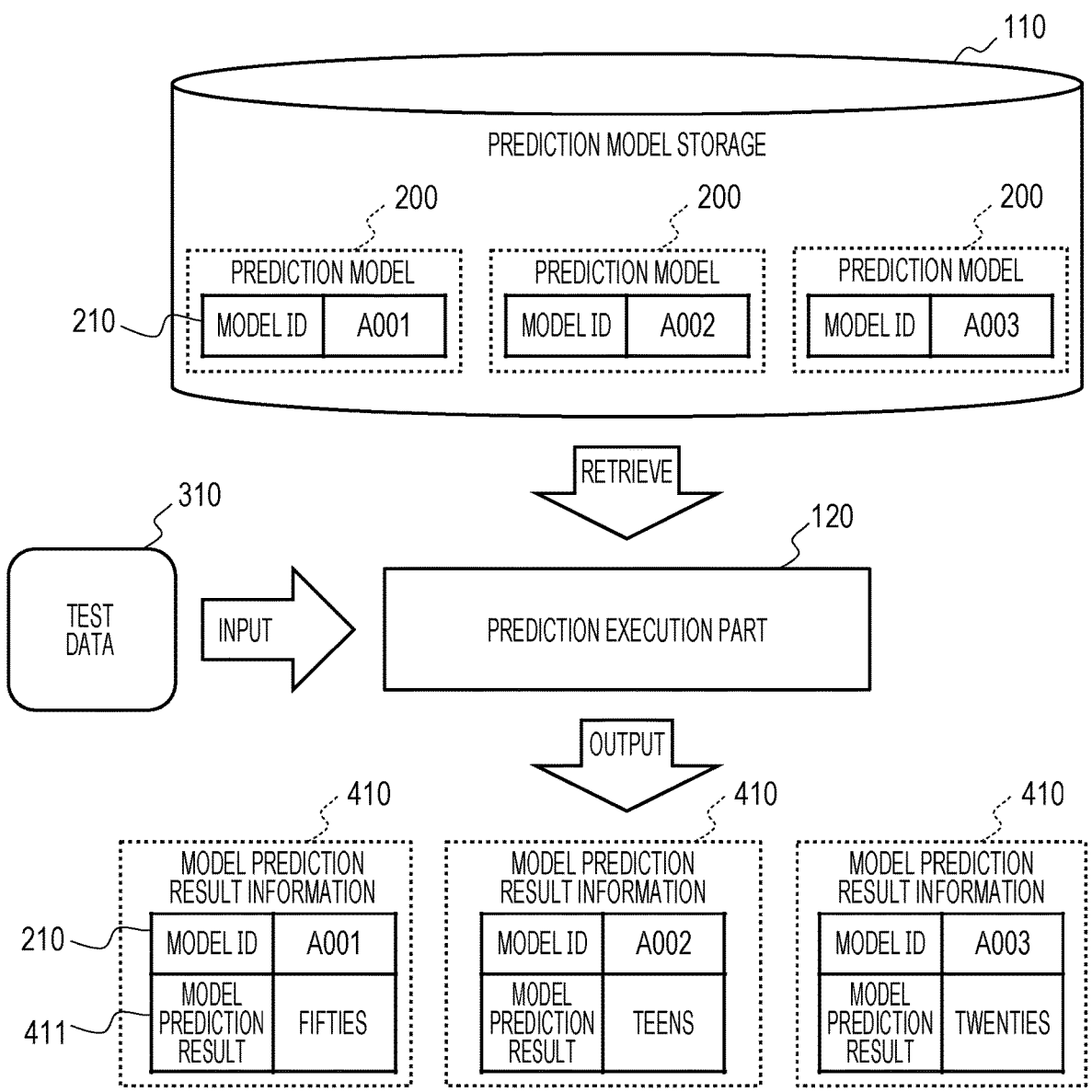
FIG. 4 is a diagram for describing an example of processing to be executed by a prediction execution part.

FIG. 4 is a diagram for describing an example of processing to be executed by the prediction execution part 120. The prediction execution part 120 executes prediction execution processing for making a prediction using the test data 310 based on the prediction model 200.

As shown in FIG. 4, in the prediction execution processing, the prediction execution part 120 receives, as input, the test data 310 to be used in prediction, the test data 310 being included in the input information 300, retrieves all the prediction models 200 stored in the prediction model storage 110, and makes a prediction using the test data 310 based on each of the prediction models 200 thus retrieved. As a result, the prediction execution part 120 derives the model prediction result information 410 for each of the prediction models 200.

The model prediction result information 410 is represented, for example, by a combination of the model ID 210 of each prediction model 200 used in prediction and the model prediction result 411 indicating the result of the prediction made using the test data 310. Specifically, the model prediction result information 410 shown in FIG. 4 indicates that "fifties" is output as the model prediction result 411 associated with the prediction model 200 having a model ID 210 of "A001", "teens" is output as the model prediction result 411 associated with the prediction model 200 having a model ID 210 of "A002", and "twenties" is output as the model prediction result 411 associated with the prediction model 200 having a model ID 210 of "A003".

(1-5) Prediction Rationale Analysis Processing

Figure 5:
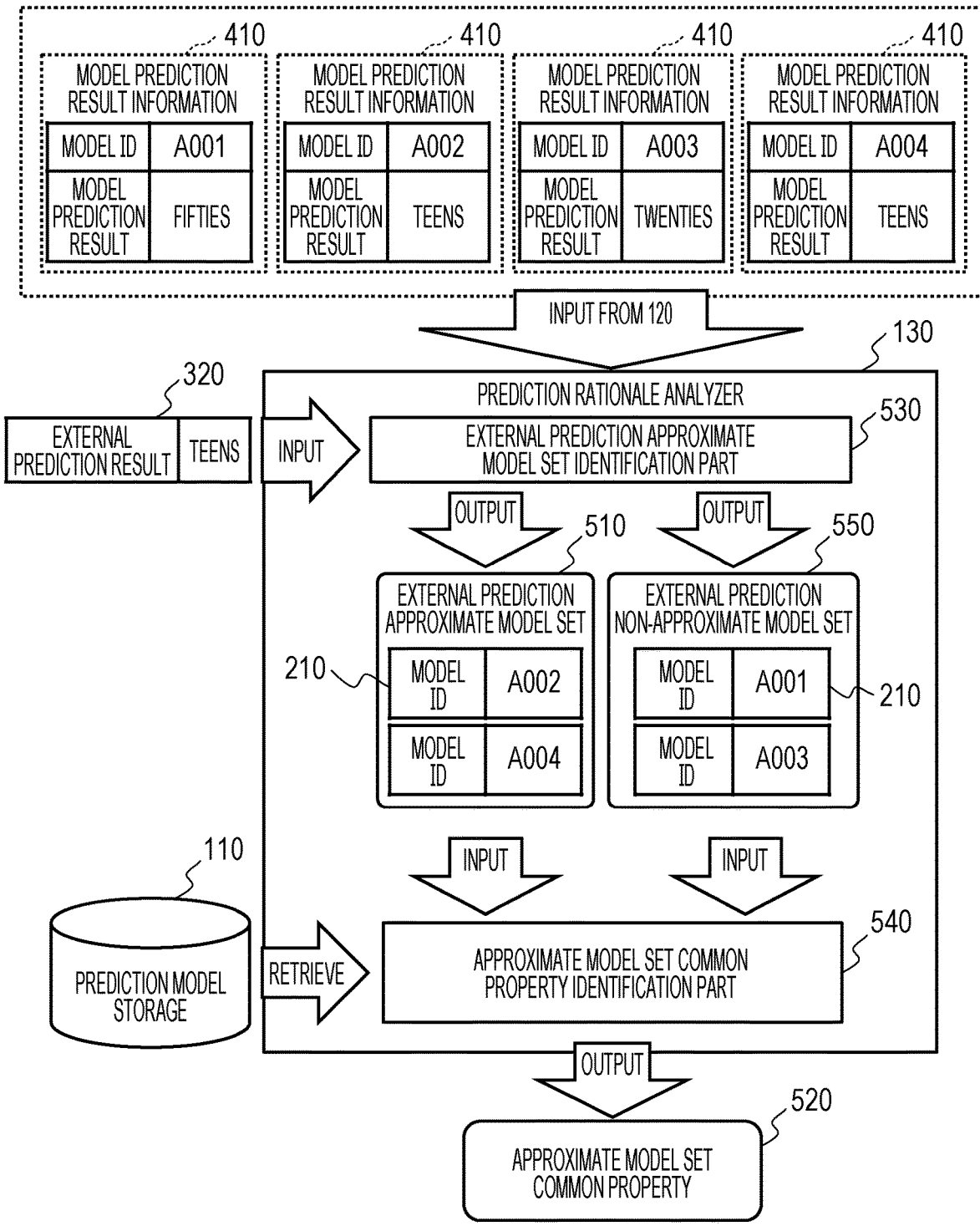
FIG. 5 is a diagram for describing an example of processing to be executed by a prediction rationale analyzer.

FIG. 5 is a diagram for describing an example of processing to be executed by the prediction rationale analyzer 130. The prediction rationale analyzer 130 executes processing for analyzing a prediction model 200 that derives a model prediction result 411 approximate to the external prediction result 320 and inferring a prediction rationale for the external prediction result 320 (prediction rationale analysis processing). The prediction rationale analyzer 130 shown in FIG. 5 includes an external prediction approximate model set identification part 530 and an approximate model set common property identification part 540.

In the prediction rationale analysis processing, first, the external prediction approximate model set identification part 530 receives, as input, the external prediction result 320 included in the input information 300, and identifies, based on a model prediction result 411 identical or approximate to the external prediction result 320 out of the model prediction results 411 included in the model prediction result information 410 derived for each prediction model 200 by the prediction execution part 120, the external prediction approximate model set 510 indicating the set of prediction models 200 based on which the model prediction results 411 are derived.

Note that, in this example, the external prediction approximate model set 510 is designed to hold a set of model IDs 210 corresponding to the prediction models 200 identified by the external prediction approximate model set identification part 530 to indicate a set of prediction models 200 in an "indirect manner". However, for the sake of simplicity, in the following description, the notation "the prediction model 200 included in the external prediction approximate model set 510" is basically used. Further, such notation for the model set is applicable to an external prediction non-approximate model set 550 (to be described later) and the like.

For example, in the case of FIG. 5, the external prediction result 320 indicates "teens". Further, in two of the four pieces of model prediction result information 410 derived by the prediction execution part 120, that is, the model prediction result information 410 having a model ID 210 of "A002" and the model prediction result information 410 having a model ID 210 of "A004", both the model prediction results 411 indicate "teens", showing that the same prediction result as the external prediction result 320 has been derived. Therefore, the external prediction approximate model set identification part 530 that has received the external prediction result 320 as input identifies the model IDs 210 of "A002" and "A004" as elements of the external prediction approximate model set 510.

Note that, for the sake of simplicity, FIG. 5 shows a case where both the prediction results (the external prediction result 320 and the model prediction result 411) are the same, but the external prediction approximate model set identification part 530 according to the present embodiment is capable of identifying the external prediction approximate model set 510 in the same manner as a case where both the prediction results approximate to each other. As a method for determining whether both the prediction results approximate to each other, for example, when the prediction results are continuous values, any threshold serving as an allowable range in which both the prediction results can be considered to approximate to each other may be preset. Further, when the prediction results are categorical values, a centroid of a data group that belongs to the same category in the training data is derived, and a distance between the centroids in each category is quantified, so that a determination can be made as to whether the prediction results approximate to each other in the same manner as the case where the prediction results are continuous values.

Further, the external prediction approximate model set identification part 530 may separately identify, as the external prediction non-approximate model set 550, a set of prediction models 200 (a set of model IDs 210 in this example) not included in the external prediction approximate model set 510, from among the prediction models 200 used by the prediction execution part 120 for deriving the model prediction result information 410.

Next, in the prediction rationale analysis processing, after the external prediction approximate model set identification part 530 identifies the external prediction approximate model set 510, the approximate model set common property identification part 540 retrieves, from the prediction model storage 110, the model properties 220 of the prediction model 200 (the model properties 220 associated with the model ID 210) included in the external prediction approximate model set 510 and identifies, as the approximate model set common property 520, a model property 220 common to the prediction models 200 included in the external prediction approximate model set 510.

Herein, the approximate model set common property identification part 540 can employ various identification methods for identifying the approximate model set common property 520, and examples of such identification methods will be given below.

Under a first identification method, the approximate model set common property identification part 540 collects only model properties 220 common to the prediction models 200 included in the external prediction approximate model set 510 and identifies the model properties 220 as the approximate model set common property 520.

Under a second identification method, the approximate model set common property identification part 540 counts the appearance frequency of each model property 220 of the prediction models 200 included in the external prediction approximate model set 510, collects model properties 220 whose appearance frequencies exceed any preset threshold, and identifies the model properties 220 as the approximate model set common property 520.

A third identification method is applicable to a case where the external prediction approximate model set identification part 530 identifies not only the external prediction approximate model set 510 but also the external prediction non-approximate model set 550. Under the third identification method, the approximate model set common property identification part 540 counts not only the appearance frequency of each model property 220 of the prediction models 200 included in the external prediction approximate model set 510, but also the appearance frequency of each model property 220 of the prediction models 200 included in the external prediction non-approximate model set 550, calculates the degree of importance of each model property 220 based on the appearance frequencies for both the model sets, collects model properties 220 whose degrees of importance thus calculated exceed any preset threshold, and identifies the model properties 220 as the approximate model set common property 520.

Note that, under the method for calculating the degree of importance in the third identification method, for example, the degree of importance is calculated by subtracting the appearance frequency for the external prediction non-approximate model set 550 from the appearance frequency for the external prediction approximate model set 510. Alternatively, the degree of importance may be calculated by dividing the appearance frequency for the external prediction approximate model set 510 by a value obtained by adding 1 to the appearance frequency for the external prediction non-approximate model set 550.

Under a fourth identification method, the approximate model set common property identification part 540 arranges, based on the appearance frequencies or degrees of importance of the model properties 220 described for the first to third identification methods, the model properties 220 in descending order (or alternatively, in ascending order) of values corresponding to the appearance frequencies or degrees of importance in the approximate model set common property 520 to create the approximate model set common property 520 in which all the model properties 220 whose appearance frequencies or degrees of importance have been calculated are ordered.

(1-6) Prediction Rationale Difference Analysis Processing

Figure 6:
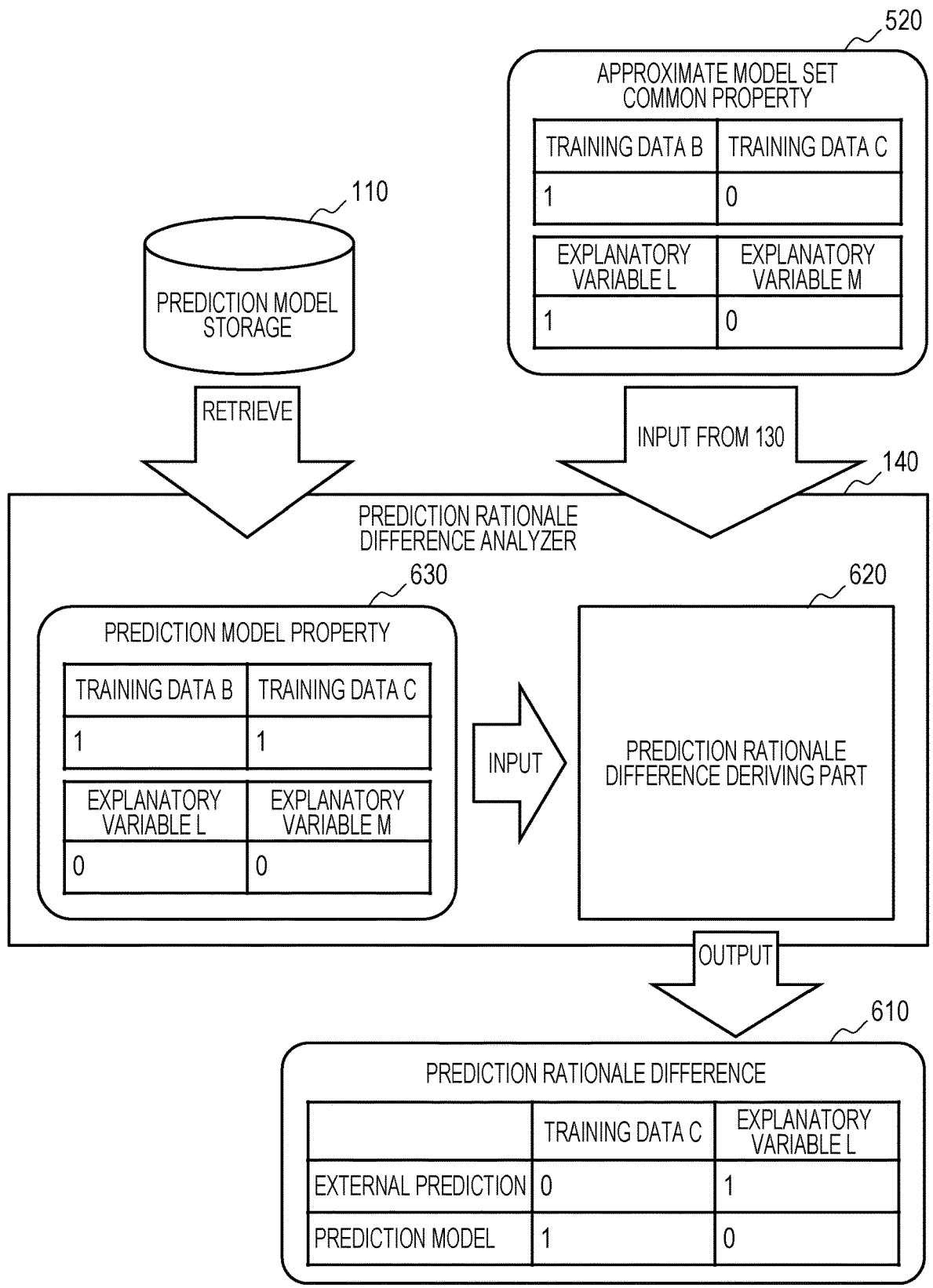
FIG. 6 is a diagram for describing an example of processing to be executed by a prediction rationale difference analyzer.

FIG. 6 is a diagram for describing an example of processing to be executed by the prediction rationale difference analyzer 140. The prediction rationale difference analyzer 140 executes prediction rationale difference analysis processing for analyzing a difference in prediction rationale between the external prediction and the prediction model. As shown in FIG. 6, the prediction rationale difference analyzer 140 includes a prediction rationale difference deriving part 620.

As shown in FIG. 6, in the prediction rationale difference analysis processing, first, the prediction rationale difference analyzer 140 receives the input of the approximate model set common property 520 from the prediction rationale analyzer 130, selects any prediction model 200 (main prediction model) from among the prediction models 200 in the prediction model storage 110, and obtains, as a prediction model property 630, property information on the same item as the approximate model set common property 520 from the model properties 220 of the prediction models 200 thus selected. Next, the prediction rationale difference deriving part 620 derives a difference between the approximate model set common property 520 and the prediction model property 630 as the prediction rationale difference 610. Then, the prediction rationale difference analyzer 140 transmits, based on the prediction rationale difference 610 thus derived, the output information 700 (see FIG. 7 for details) including the prediction rationale difference 610 to the output device 160 to cause the output device 160 to output the output information 700 in any output format (display or printing).

Giving a detailed description of the derivation of the prediction rationale difference 610, for example, FIG. 6 partially shows the training data usage information 221 and the explanatory variable usage information 224 as the model property 220 in the approximate model set common property 520 inferred as the prediction rationale of the external prediction result 320, in which the training data C is "0" that is a property value indicating that the training data C is not used, and the explanatory variable L is "1" that is a property value indicating that the explanatory variable L is used. On the other hand, in the prediction model property 630, the training data C is "1" that is a property value indicating that the training data C is used, and the explanatory variable L is "0" that is a property value indicating the explanatory variable L is not used. Therefore, the prediction rationale difference deriving part 620 outputs, as the difference in prediction rationale between the external prediction and the prediction model 200, the respective property values of the training data C and the explanatory variable L in the approximate model set common property 520 and the prediction model property 630 to the prediction rationale difference 610.

Note that, according to the present embodiment, the target model (main prediction model) for use in deriving the prediction rationale difference 610 can be randomly selected from among the plurality of prediction models 200 stored in the prediction model storage 110, allowing the main prediction model to be selected based on various criteria (for example, a model is suitable or unsuitable) to compare a difference in prediction rationale between the main prediction model and the external prediction.

Further, when attention is paid to prediction accuracy, for example, from among the prediction models 200 stored in the prediction model storage 110, the "best model" having the highest prediction accuracy for training data may be selected as the main prediction model. This derives the prediction rationale difference 610 between the prediction model 200 with the highest prediction accuracy based on machine learning and the external prediction, so that, when a user receives the output of the output information 700 based on the prediction rationale difference 610 and gives consideration to improvements in prediction activity, it can be expected to show a difference in prediction rationale with a high degree of influence.

Further, according to the present embodiment, the plurality of prediction models 200 stored in the prediction model storage 110 may be a set of the above-described best model and at least one variant prediction model having some of the model properties 220 slightly changed from corresponding model properties 220 of the best model. The variant prediction model may be, for example, a model having any one of the property items changed from a corresponding property item of the model properties 220 of the best model, or alternatively, may be a set of models that covers all combinations of presence and absence of changes in all the property items from the best model. Specifically, for example, when the training data usage information 221 of the model property 220 has four property items, the training data A to D, a maximum of 15 variant prediction models can be created based on all the combinations of presence and absence of changes in all the property items, the number of variant prediction models being obtained by subtracting 1 (corresponding to the best model) from two to the power of four. Furthermore, when not only the presence and absence of changes but also variations of change contents are taken into consideration, it is possible to create a larger number of variant prediction models based on all the combinations.

When the best model and at least one variant prediction model are stored in the prediction model storage 110 as described above, the prediction rationale difference analyzer 140 may not only select the best model as the main prediction model and derive the prediction rationale difference 610, but also select the variant prediction model as the main prediction model and derive the prediction rationale difference 610. This not only allows a comparison between the best model and the external prediction for a difference in prediction rationale when the user gives consideration to improvements in prediction activity upon output of the output information 700 based on the prediction rationale difference 610, but also allows a comparison between the external prediction and the variant prediction model slightly changed from the best model for a difference in prediction rationale, making it possible to create information from which a detailed examination on where the difference occurs can be made and thus facilitate consideration of improvements with higher accuracy.

(1-7) Output Information 700

Figure 7:
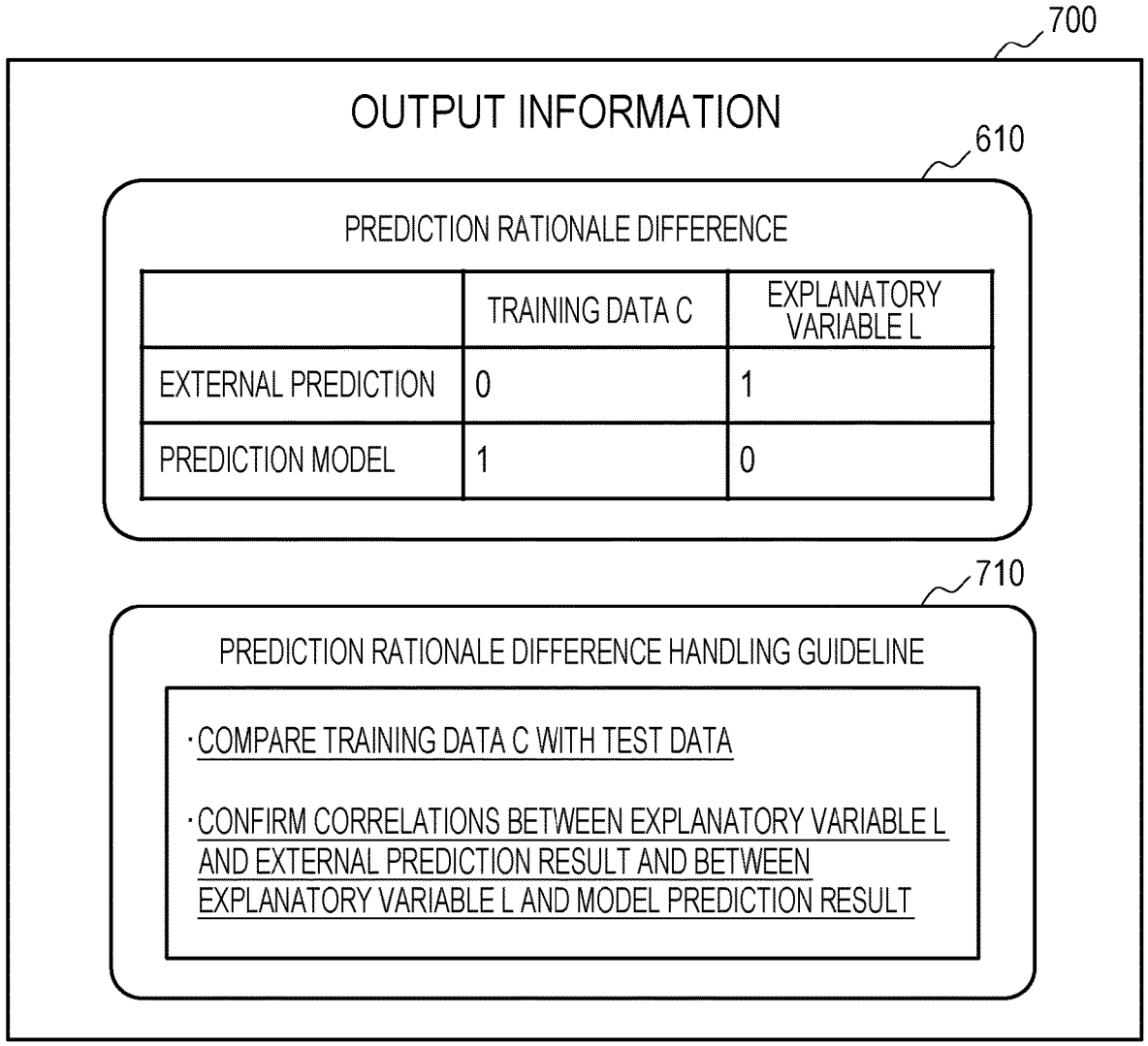
FIG. 7 is a diagram showing an example of output information.

FIG. 7 is a diagram showing an example of the output information 700. FIG. 7 shows an example of the output information 700 displayed on a display screen of the output device 160. The output information 700 shown in FIG. 7 includes the prediction rationale difference 610 derived by the prediction rationale difference analyzer 140, and the prediction rationale difference handling guideline 710 that is an example of a guideline for the user to interpret the prediction rationale difference 610 and to help improve the prediction activity.

Output contents of the prediction rationale difference handling guideline 710 are determined based on contents of the prediction rationale difference 610. For example, when whether the training data has been used is derived in the prediction rationale difference 610, a message or the like describing a recommendation "compare training data C with test data" can be displayed, as in the prediction rationale difference handling guideline 710 shown in FIG. 7. Furthermore, with the target training data (training data C) stored in the prediction model storage 110, the prediction rationale analysis apparatus 100 may have a function of displaying, when an operation (for example, click) of selecting the message of the output information 700 is performed on the output device 160, data mentioned in the message (specifically, the training data C and the test data) side by side.

Further, for example, when information on whether the explanatory variable is used, information on a weight given to the explanatory variable, or the like is derived in the prediction rationale difference 610, a message describing a recommendation "confirm correlations between explanatory variable L and external prediction result and between explanatory variable L and model prediction result" can be displayed, as in the prediction rationale difference handling guideline 710 shown in FIG. 7. Furthermore, with the correlation data between the target explanatory variable and objective variable stored in the prediction model storage 110, the prediction rationale analysis apparatus 100 may have a function of displaying, when an operation (for example, click) of selecting the message of the output information 700 is performed on the output device 160, data mentioned in the message (specifically, the correlation data on the explanatory variable L).

As described above, the prediction rationale analysis apparatus 100 according to the first embodiment is capable of analyzing a difference in prediction rationale between at least two prediction means (the external prediction means including a predictor and the prediction model) that have carried out the prediction activity on the same input data to identify the prediction rationale difference 610. Specifically, for example, when the result of the external prediction made by a human is wrong, and the result of the prediction made using the best model is correct, it is possible to present, using the prediction rationale of the best model, the prediction rationale to be considered in order to derive the correct prediction result when a human makes a prediction by identifying a difference between the prediction rationale for the external prediction (the prediction rationale inferred by the prediction rationale analyzer 130) and the prediction rationale based on the main prediction model (the best model).

Furthermore, the prediction rationale analysis apparatus 100 according to the first embodiment can output the output information 700 based on the prediction rationale difference 610 thus identified, so as to present materials for comparison and consideration given to excess and deficiency of prediction rationale, superiority or inferiority of prediction ability, tendency of suitable input data, and the like in each of the prediction means (external prediction and prediction model) that performed a prediction activity.

(2) Second Embodiment

A prediction rationale analysis apparatus 800 according to a second embodiment of the present invention will be described. The following description of the second embodiment will focus on points changed from or added to the first embodiment, and no description will be given of the same structure or input/output information as of the prediction rationale analysis apparatus 100 according to the first embodiment.

Figure 8:
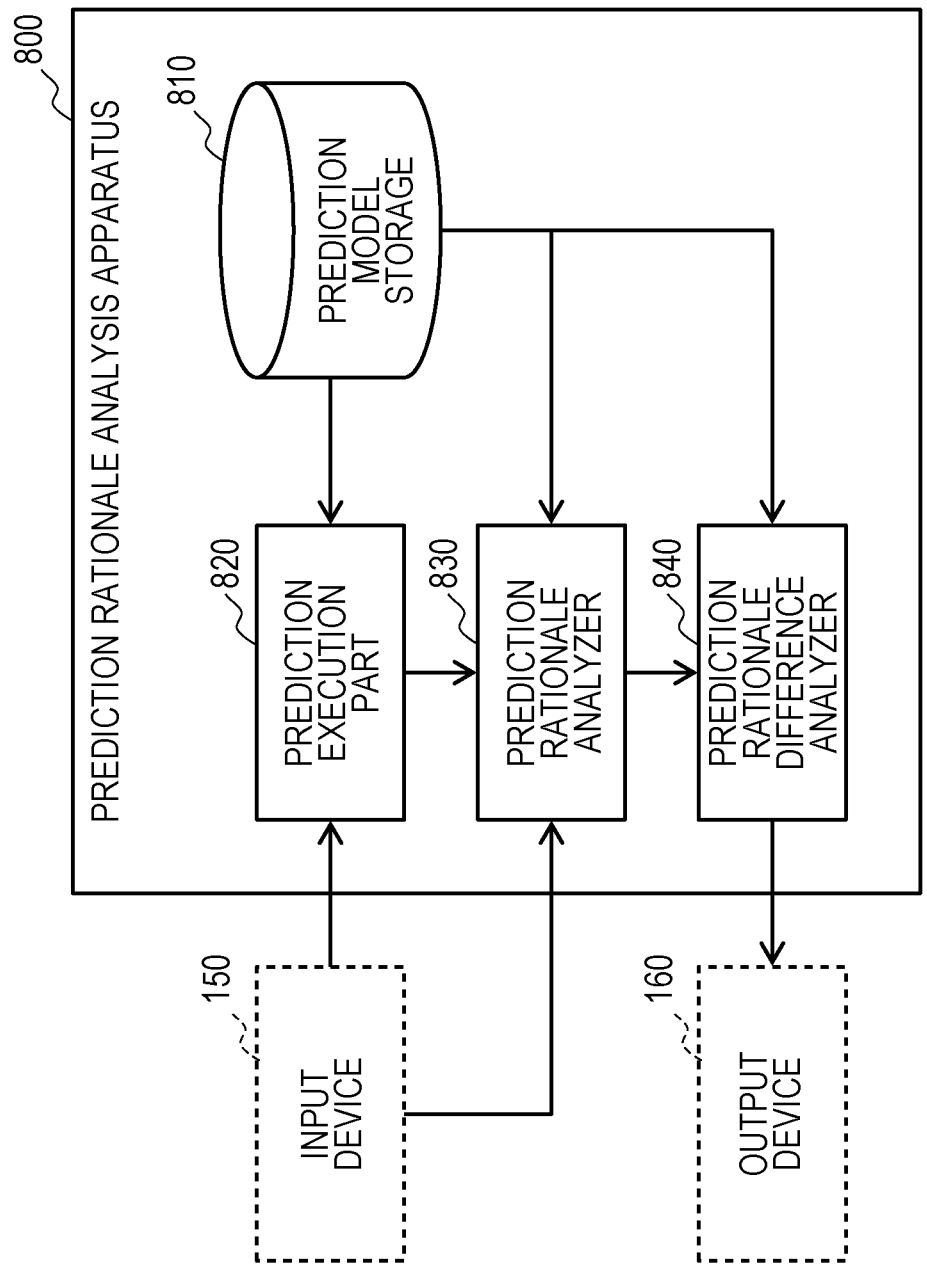
FIG. 8 is a block diagram showing an example of a structure of a prediction rationale analysis apparatus according to a second embodiment.

FIG. 8 is a block diagram showing an example of a structure of the prediction rationale analysis apparatus 800 according to the second embodiment. The prediction rationale analysis apparatus 800 is a computer including, for example, a processor, a storage device, various interfaces, and the like, as is the case with the prediction rationale analysis apparatus 100 according to the first embodiment. The prediction rationale analysis apparatus 800 includes, as functional components, a prediction model storage 810, a prediction execution part 820, a prediction rationale analyzer 830, and a prediction rationale difference analyzer 840.

The prediction model storage 810 stores at least two prediction models 200 designed or trained to solve a problem related to a common prediction activity, as is the case with the prediction model storage 110 according to the first embodiment, and each of the prediction models 200 includes, for example, a model ID 210, a model property 220, and a prediction execution entity 230.

The prediction execution entity 230 according to the second embodiment is an algorithm designed and trained based on preconditions included in the model property 220 and having a function of making a prediction upon input of test data 310. However, the prediction execution entity 230 according to the second embodiment has a function of not only deriving, when making a prediction using the test data 310, a result of the prediction (model prediction result), but also deriving a rationale for the prediction on the model prediction result (model prediction rationale), and further has a function of deriving model prediction result information including the model prediction result and the model prediction rationale.

Figure 9:
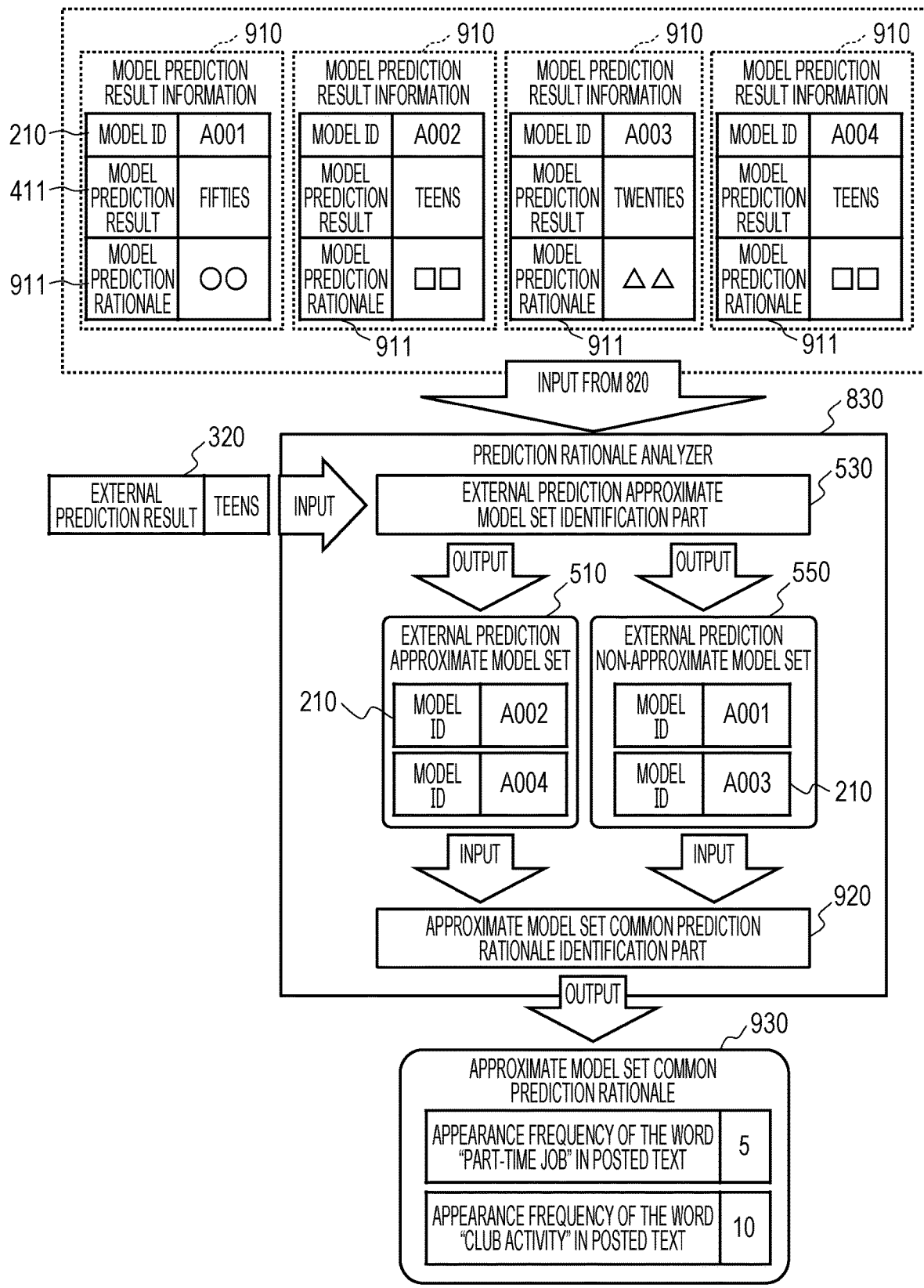
FIG. 9 is a diagram for describing an example of processing to be executed by a prediction rationale analyzer.

Specifically as shown in FIG. 9 to be described later, this causes model prediction result information 910 according to the second embodiment to be represented by a combination of the model ID 210 of the prediction model 200 used in prediction, a model prediction result 411 indicating the result of the prediction made using the test data 310, and a model prediction rationale 911 that is a rationale for the prediction of the model prediction result 411. Note that, as a method for deriving the model prediction rationale 911 by the prediction execution entity 230 according to the second embodiment, for example, the conventional technique disclosed in JP 2019-082883 A, Marco Tulio Ribeiro et al., (2016) "'Why Should I Trust You?': Explaining the Predictions of Any Classifier", Proceedings of the 22nd ACM SIGKDD International Conference on Knowledge Discovery and Data Mining, Pages 1135-1144, or Pang Wei Koh et al., (2017) "Understanding black-box predictions via influence functions", Proceedings of the 34th International Conference on Machine Learning—Volume 70, Pages 1885-18944 may be employed.

The prediction execution part 820 receives, as input, the test data 310 to be used in prediction, and makes a prediction using the test data 310 based on all the prediction models 200 stored in the prediction model storage 810 to derive the model prediction result information 910 for each of the prediction models 200.

The prediction rationale analyzer 830 has a function of inferring a prediction rationale for a result of a prediction using the test data 310 made by an external means (external prediction result 320) based on the model prediction result information 910 on the same test data 310 from the prediction execution part 820, more specifically, by analyzing the model prediction rationale 911, in the model prediction result information 910, for a prediction model 200 based on which a model prediction result 411 approximate to the external prediction result 320 is derived.

FIG. 9 is a diagram for describing an example of processing to be executed by the prediction rationale analyzer 830. As shown in FIG. 9, the prediction rationale analyzer 830 includes an external prediction approximate model set identification part 530 and an approximate model set common prediction rationale identification part 920. The processing to be executed by the prediction rationale analyzer 830 will be described with reference to FIG. 9.

First, the prediction rationale analyzer 830 receives the external prediction result 320 as input. Next, the external prediction approximate model set identification part 530 identifies an external prediction approximate model set 510 that is a set of prediction models 200 based on which model prediction results 411 identical or approximate to the external prediction result 320 are derived. Further, the external prediction approximate model set identification part 530 may be configured to separately identify, as an external prediction non-approximate model set 550, a set of prediction models 200 (a set of model IDs 210 in this example) that are not included in the external prediction approximate model set 510 among the prediction models 200 used for deriving the model prediction result information 910 by the prediction execution part 820. The processing for identifying the external prediction approximate model set 510 (and the external prediction non-approximate model set 550) by the external prediction approximate model set identification part 530 according to the second embodiment is the same as according to the first embodiment.

Next, after the external prediction approximate model set identification part 530 identifies the external prediction approximate model set 510 (and the external prediction non-approximate model set 550), the approximate model set common prediction rationale identification part 920 obtains the model prediction rationale 911 associated with each prediction model 200 included in the external prediction approximate model set 510 (the prediction model 200 associated with the model ID 210 in the external prediction approximate model set 510) from the model prediction result information 910 output from the prediction execution part 820 and identifies, as an approximate model set common prediction rationale 930, a prediction rationale commonly appearing among the model prediction rationales 911 thus obtained.

Note that, according to the second embodiment, the method for identifying the approximate model set common prediction rationale 930 by the approximate model set common prediction rationale identification part 920 may be based on the method (the first to fourth identification methods) for identifying the approximate model set common property 520 by the approximate model set common property identification part 540 according to the first embodiment.

For example, FIG. 9 shows a specific example of the approximate model set common prediction rationale 930 derived under the mutatis mutandis application of the second identification method. This specific example is based on a case where words extracted from data posted on an SNS are shown in the model prediction rationale 911, and among these words, the words "part-time job" and "club activity" (prediction rationales) commonly appear in the model prediction rationale 911 associated with each prediction model 200 included in the external prediction approximate model set 510, in which the approximate model set common prediction rationale 930 identifies "part-time job" and "club activity" as common prediction rationales and derives the appearance frequency of each word (prediction rationale).

Further, for example, under the mutatis mutandis application of the fourth identification method, the approximate model set common prediction rationale identification part 920 can create the approximate model set common prediction rationale 930 in which the model prediction rationales 911 each associated with a corresponding one of the prediction models 200 included in the external prediction approximate model set 510 are arranged in descending order (or alternatively, in ascending order) of their values based on the appearance frequency or degree of importance of the commonly appearing prediction rationale.

The prediction rationale difference analyzer 840 has a function of analyzing, based on the prediction rationale of the external prediction result 320 inferred by the prediction rationale analyzer 830 and the prediction rationale of the model prediction result information 910 associated with any one of the prediction models 200, a difference in prediction rationale (prediction rationale difference) between the external prediction and the prediction model.

Figure 10:
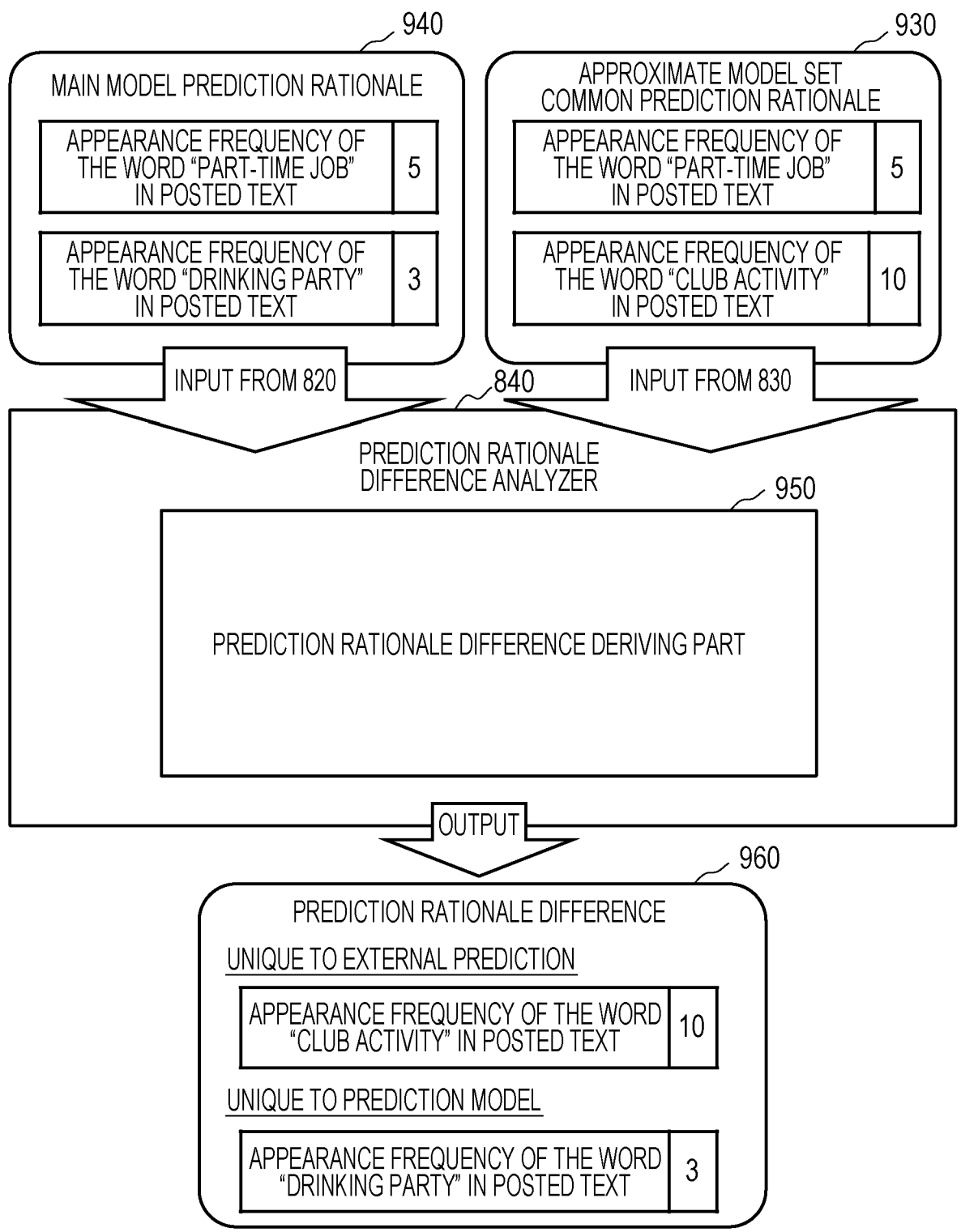
FIG. 10 is a diagram for describing an example of processing to be executed by a prediction rationale difference analyzer.

FIG. 10 is a diagram for describing an example of processing to be executed by the prediction rationale difference analyzer 840. The prediction rationale difference analyzer 840 shown, as an example, in FIG. 10 includes a prediction rationale difference deriving part 950. The processing to be executed by the prediction rationale difference analyzer 840 will be described with reference to FIG. 10.

First, the prediction rationale difference analyzer 840 receives, as input, the prediction rationale for the external prediction result 320 (approximate model set common prediction rationale 930) inferred by the prediction rationale analyzer 830 and the model prediction rationale 911 (main model prediction rationale 940) included in the model prediction result information 910 associated with any one (main prediction model) of the prediction models 200 stored in the prediction model storage 810.

Next, the prediction rationale difference deriving part 950 compares the prediction rationales thus input to derive a difference as a prediction rationale difference 960. Since the approximate model set common prediction rationale 930 is a "prediction rationale for external prediction" inferred from the prediction model 200 based on which the model prediction result 411 approximate to the external prediction result 320 is derived, the prediction rationale difference deriving part 950 can analyze and identify a difference in prediction rationale between the external prediction and the main prediction model by comparing the approximate model set common prediction rationale 930 with the main model prediction rationale 940 for the main prediction model to extract a difference between the approximate model set common prediction rationale 930 and the main model prediction rationale 940.

Note that the structure of the prediction rationale difference 960 is not limited to a specific structure. For example, FIG. 10 shows a possible structure in which a prediction rationale the approximate model set common prediction rationale 930 has, but the main model prediction rationale 940 does not have is represented as a rationale "unique to the external prediction", and a prediction rationale the approximate model set common prediction rationale 930 does not have, but the main model prediction rationale 940 has is represented as a rationale "unique to the prediction model". Further, as shown in FIG. 10, the prediction rationale difference 960 indicates not only a prediction rationale indicating a difference, but also the appearance frequency of the prediction rationale, allowing an increase in the amount of information useful for prediction activity.

Then, the prediction rationale difference analyzer 840 transmits, based on the prediction rationale difference 960 thus derived, output information 700 including the prediction rationale difference 960 to an output device 160 to cause the output device 160 to output the output information 700 in any output format (display or printing). The contents and output method of the output information 700 may be the same as according to the first embodiment; thus, no detailed description will be given of the contents and output method.

As described above, the prediction rationale analysis apparatus 800 according to the second embodiment is capable of analyzing a difference in prediction rationale between at least two prediction means (the external prediction means including a predictor and the prediction model) that have carried out the prediction activity on the same input data to identify the prediction rationale difference 960. Then, the prediction rationale analysis apparatus 800 according to the second embodiment can output the output information 700 based on the prediction rationale difference 960 thus identified, so as to present materials for comparison and consideration given to excess and deficiency of prediction rationale, superiority or inferiority of prediction ability, tendency of suitable input data, and the like in each of the prediction means (external prediction and prediction model) that performed a prediction activity. In particular, according to the second embodiment, in the prediction rationale difference 960, the prediction rationale indicating a difference is represented in a specific form (for example, a word and its appearance frequency); therefore, it is possible to present a difference in prediction rationale between the external prediction and the prediction model in a specific and easy-to-understand form for a user as compared to the first embodiment according to which the prediction rationale is represented by a property item of the model property 220.

Although the embodiments of the present invention have been described in detail, the present invention is not limited to the above-described embodiments, and may be modified without departing from the scope of the present invention and include various modifications. For example, the above-described embodiments have been described in detail to facilitate the understanding of the present invention, and the present invention is not necessarily limited to an embodiment having all the components described above. Further, some of the components of one embodiment can be replaced with corresponding components of another embodiment, and a component of another embodiment can be added to the components of one embodiment. Further, it is possible to add different components to the components of each embodiment, delete some of the components of each embodiment, and replace some of the components of each embodiment with different components.

For example, according to either the first embodiment or the second embodiment, the prediction rationale analysis apparatus 100, 800 may receive a plurality of external prediction results for the test data 310 as the external prediction result 320 for the test data 310. Further, in this case, the prediction rationale analysis apparatus 100, 800 may cause the prediction rationale analyzer 130, 830 to derive the approximate model set common property 520 or the approximate model set common prediction rationale 930 for each external prediction result 320 and cause the prediction rationale difference analyzer 140, 840 (prediction rationale difference deriving part 620, 950) to analyze a difference in rationale difference. The prediction rationale analysis apparatus 100, 800 configured as described above can identify and present, even in a case where, for example, a plurality of persons make a prediction using the test data 310, a difference between each external prediction rationale and the model prediction rationale and facilitate consideration of improvements in prediction activity.

Further, some or all of the components, functions, processing units, processing means, and the like described above may be implemented by hardware such as an integrated circuit designed to implement some or all of the components, functions, processing units, processing means, and the like. Further, each of the components, functions, and the like described above may be implemented by software that causes the processor to interpret and execute a program that makes each function work. Information such as a program, a table, and a file for making each function work may be stored in a memory, a hard disk, a storage device such as an SSD, or a recording medium such as an IC card, an SD card, or a DVD.

Further, control lines and information lines considered necessary for the description are only shown in the drawings, and all the control lines and information lines necessary for the product are not necessarily shown. In practice, it may be considered that almost all the components are mutually connected.

What is claimed is:

1. A prediction rationale analysis apparatus that analyzes a prediction rationale for a prediction activity, comprising:
   a prediction model storage that stores a plurality of prediction models designed or trained to solve a common problem;
   a prediction execution part that makes, upon receipt of information on a prediction target, a prediction on the prediction target based on each of the plurality of prediction models to derive a model prediction result indicating a result of the prediction;
   a prediction rationale analyzer that identifies, upon receipt of an external prediction result indicating a result of an external prediction made on the prediction target by an external means, a set of the prediction models based on which the model prediction result is derived from the prediction made on the prediction target by the prediction execution part, the model prediction result being identical or approximate to the external prediction result, and infers, as a prediction rationale for the external prediction result, a property common to the prediction models belonging to the set of prediction models; and
   a prediction rationale difference analyzer that compares a property of any one of the plurality of prediction models stored in the prediction model storage with the prediction rationale for the external prediction result inferred by the prediction rationale analyzer to derive a prediction rationale difference indicating a difference in prediction rationale between the prediction model and the external prediction, and outputs information based on the prediction rationale difference.

2. The prediction rationale analysis apparatus according to claim 1, wherein
   the plurality of prediction models are trained based on machine learning, and
   a property of each of the plurality of prediction models includes training data used in the training.

3. The prediction rationale analysis apparatus according to claim 1, wherein the plurality of prediction models are trained based on machine learning, and a property of each of the plurality of prediction models includes an explanatory variable used in the training.

4. The prediction rationale analysis apparatus according to claim 1, wherein the prediction model storage stores, as the plurality of prediction models, any main prediction model, and at least one variant prediction model having a property partially changed from a property of the main prediction model.

5. The prediction rationale analysis apparatus according to claim 1, wherein the prediction rationale analyzer first identifies the set of prediction models, calculates an appearance frequency of each of the properties of the prediction models belonging to the set of prediction models, and infers, as the prediction rationale for the external prediction result, a set of the properties whose appearance frequencies calculated exceed a preset threshold.

6. The prediction rationale analysis apparatus according to claim 1, wherein the prediction rationale analyzer first identifies the set of prediction models, calculates a degree of importance of each of the properties of all of the plurality of prediction models stored in the prediction model storage based on an appearance frequency of each of the properties of the prediction models belonging to the set of prediction models and an appearance frequency of each of the properties of the prediction models not belonging to the set of prediction models, and infers, as the prediction rationale for the external prediction result, a set of the properties arranged in order of the degree of importance calculated.

7. The prediction rationale analysis apparatus according to claim 1, wherein the prediction rationale difference analyzer outputs, as the information based on the prediction rationale difference, the prediction rationale difference derived and a guideline example based on the prediction rationale difference for facilitation of improvements in the prediction activity.

8. A prediction rationale analysis apparatus that analyzes a prediction rationale for a prediction activity, comprising:

a prediction model storage that stores a plurality of prediction models that are designed or trained to solve a common problem and based on which a prediction result of and a prediction rationale for a prediction made on a prediction target are derived;

a prediction execution part that makes, upon receipt of information on the prediction target, the prediction on the prediction target based on each of the plurality of prediction models to derive a model prediction result indicating a result of the prediction and a model prediction rationale indicating a rationale for the prediction;

a prediction rationale analyzer that identifies, upon receipt of an external prediction result indicating a result of an external prediction made on the prediction target by an external means, a set of the prediction models based on which the model prediction result is derived from the prediction made on the prediction target by the prediction execution part, the model prediction result being identical or approximate to the external prediction result, and infers, as a prediction rationale for the external prediction result, the model prediction rationale common to the prediction models belonging to the set of prediction models; and a prediction rationale difference analyzer that compares the model prediction rationale for a prediction based on any one of the plurality of prediction models stored in the prediction model storage with the prediction rationale for the external prediction result inferred by the prediction rationale analyzer to derive a prediction rationale difference indicating a difference in prediction rationale between the prediction model and the external prediction, and outputs information based on the prediction rationale difference.

9. The prediction rationale analysis apparatus according to claim 8, wherein the prediction rationale analyzer first identifies the set of prediction models, calculates an appearance frequency of each of the model prediction rationales derived based on the prediction models belonging to the set of prediction models, and infers, as the prediction rationale for the external prediction result, a set of the model prediction rationales whose appearance frequencies calculated exceed a preset threshold.

10. The prediction rationale analysis apparatus according to claim 8, wherein the prediction rationale analyzer first identifies the set of prediction models, calculates a degree of importance of each of the model prediction rationales derived based on all the plurality of prediction models stored in the prediction model storage, based on an appearance frequency of each of the model prediction rationales derived based on the prediction models belonging to the set of prediction models and an appearance frequency of each of the model prediction rationales derived based on the prediction models not belonging to the set of prediction models, and infers, as the prediction rationale for the external prediction result, a set of the model prediction rationales arranged in order of the degree of importance calculated.

11. A prediction rationale analysis method for causing a prediction rationale analysis apparatus to analyze a prediction rationale for a prediction activity, the prediction rationale analysis apparatus including a prediction model storage that stores a plurality of prediction models designed or trained to solve a common problem, the prediction rationale analysis method comprising:

a prediction execution step of making, upon receipt of information on a prediction target, a prediction on the prediction target based on each of the plurality of prediction models stored in the prediction model storage to derive a model prediction result indicating a result of the prediction;

a prediction rationale analysis step of identifying, upon receipt of an external prediction result indicating a result of an external prediction made on the prediction target by an external means, a set of the prediction models based on which the model prediction result is derived from the prediction made on the prediction target in the prediction execution step, the model prediction result being identical or approximate to the external prediction result, and inferring, as a prediction rationale for the external prediction result, a property common to the prediction models belonging to the set of prediction models; and a prediction rationale difference analysis step of comparing a property of any one of the plurality of prediction models stored in the prediction model storage with the prediction rationale for the external prediction result inferred in the prediction rationale analysis step to derive a prediction rationale difference indicating a difference in prediction rationale between the prediction model and the external prediction, and outputting information based on the prediction rationale difference.

* * * * *